(12) United States Patent
Eden et al.

(10) Patent No.: US 12,027,025 B2
(45) Date of Patent: Jul. 2, 2024

(54) DEVICE, SYSTEM AND METHOD FOR SECURING AN ITEM

(71) Applicant: WISESENSE LTD., Tel Aviv (IL)

(72) Inventors: Shuki Eden, Tel Aviv (IL); Sharon Doron, Rosh-Haayin (IL); Ran Oren, Tel Aviv (IL); Ziv Goldin, Holon (IL); Alexander Kurayev, Ramat Gan (IL); Yaakov Shikar, Bat-Yam (IL); Alon Shoavi, Herzlyia (IL)

(73) Assignee: WISESENSE LTD., Kfar Saba (IL)

( * ) Notice: Subject to any disclaimer, the term of this patent is extended or adjusted under 35 U.S.C. 154(b) by 28 days.

(21) Appl. No.: 17/798,631

(22) PCT Filed: Feb. 11, 2021

(86) PCT No.: PCT/IL2021/050167
§ 371 (c)(1),
(2) Date: Aug. 10, 2022

(87) PCT Pub. No.: WO2021/161315
PCT Pub. Date: Aug. 19, 2021

(65) Prior Publication Data
US 2023/0154301 A1 May 18, 2023

Related U.S. Application Data

(60) Provisional application No. 62/975,901, filed on Feb. 13, 2020.

(51) Int. Cl.
G08B 13/24 (2006.01)
E05B 73/00 (2006.01)
G07C 9/00 (2020.01)

(52) U.S. Cl.
CPC ..... G08B 13/2434 (2013.01); G07C 9/00182 (2013.01); G08B 13/246 (2013.01); E05B 73/0017 (2013.01)

(58) Field of Classification Search
CPC .............. G08B 13/2434; G08B 13/246; G07C 9/00182; E05B 73/0017
(Continued)

(56) References Cited

U.S. PATENT DOCUMENTS 5,535,606 A * 7/1996 Nguyen .............. E05B 73/0017
70/57.1
5,955,951 A * 9/1999 Wischerop .......... E05B 73/0017
70/57.1
(Continued)

FOREIGN PATENT DOCUMENTS

CN 107762294 A * 3/2018 ......... E05B 73/0017
WO WO 2019/168943 9/2019

OTHER PUBLICATIONS

International Search Report of Application No. PCT/112021/050167 dated Mar. 22, 2021.

*Primary Examiner* — Kam Wan Ma
(74) *Attorney, Agent, or Firm* — PEARL COHEN ZEDEK LATZER BARATZ LLP

(57) ABSTRACT

A method for a secured purchase process. The method may include encoding a device with a unique identification code related to a specific item, attaching the device to the item by a locking mechanism included in the device, receiving, by a receiver included in the device, a signal upon a completion of a payment transaction related to the unique identification code, enabling an unlocking movement of the locking mechanism upon receipt of the signal, and unlocking the locking mechanism to enable releasing the device from the item.

7 Claims, 12 Drawing Sheets

(58) Field of Classification Search
USPC .......................................................... 340/571
See application file for complete search history.

(56) References Cited

U.S. PATENT DOCUMENTS

| | | |
|---|---|---|
| 9,627,804 B2 | 4/2017 | Barth et al. |
| 10,325,464 B1* | 6/2019 | Trivelpiece ............ G07G 1/009 |
| 2007/0024448 A1* | 2/2007 | Sayegh ............... E05B 73/0017 |
| | | 340/572.1 |
| 2013/0132279 A1 | 5/2013 | Nordstorm |
| 2015/0243145 A1* | 8/2015 | Nguyen ............. E05B 73/0017 |
| | | 340/572.8 |
| 2019/0012722 A1 | 1/2019 | Mokhasi |
| 2019/0221093 A1* | 7/2019 | Perez ................. G08B 13/2434 |

* cited by examiner

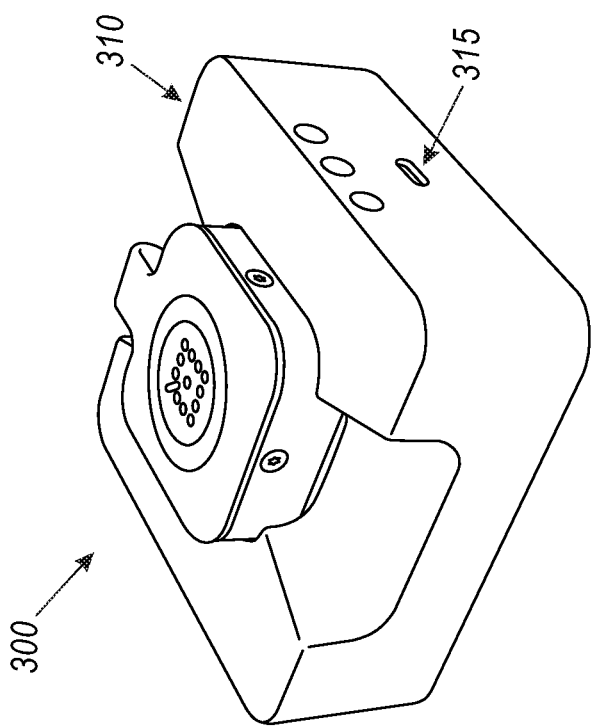
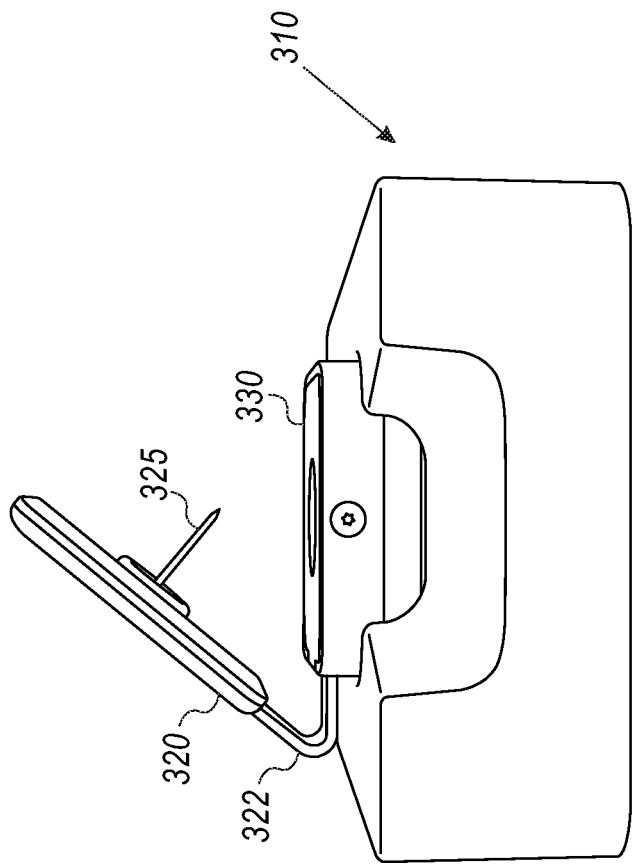

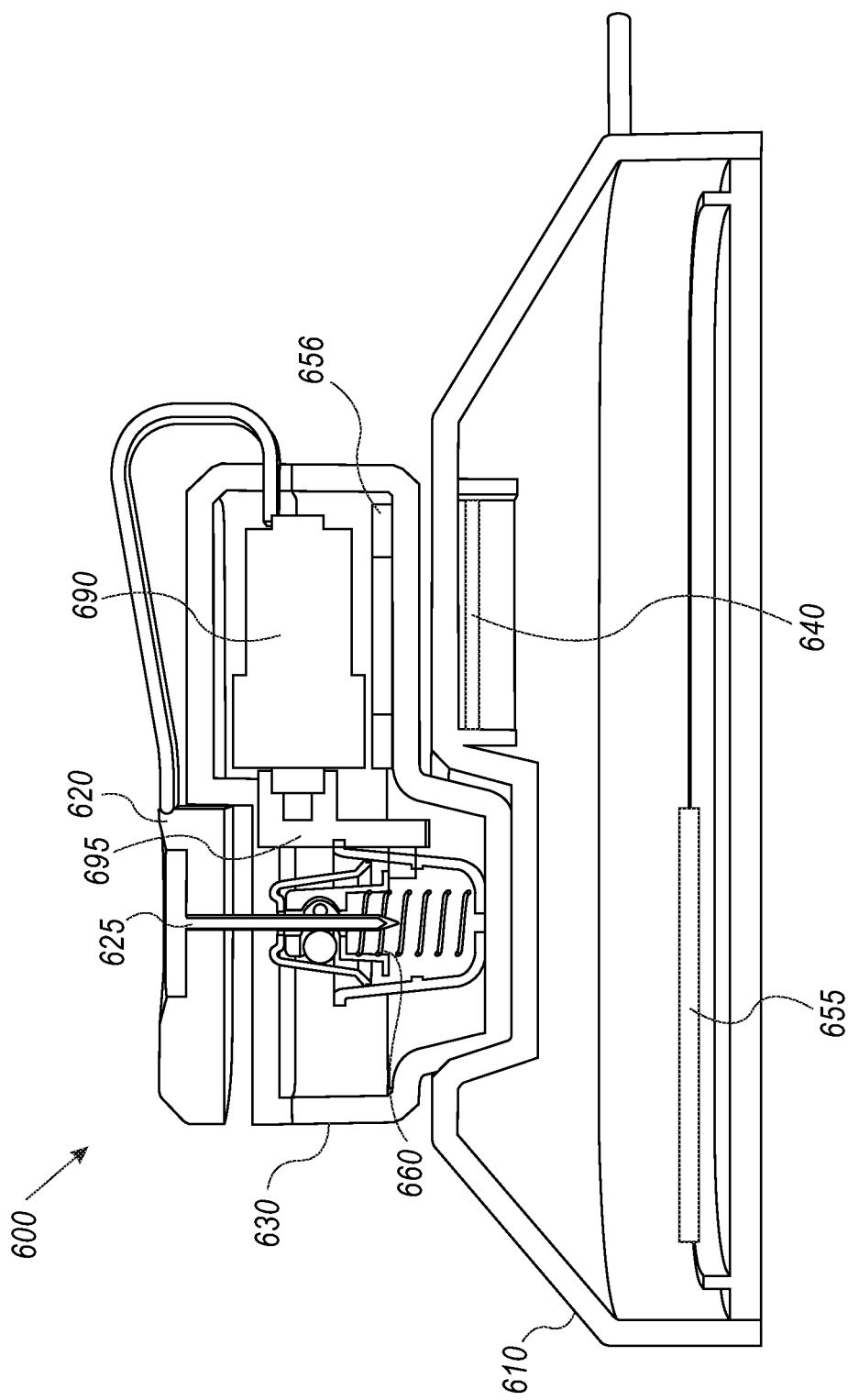

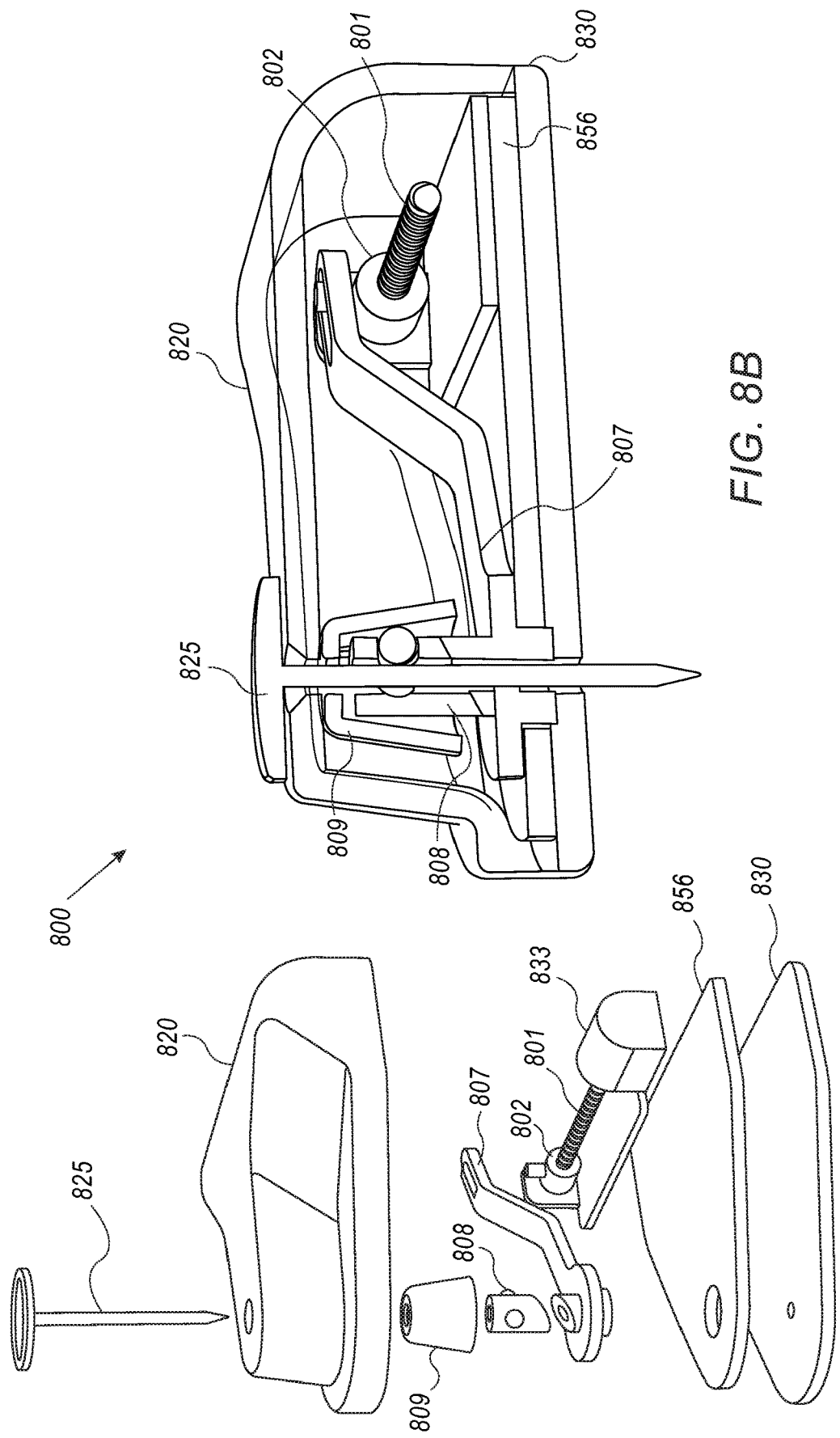

DEVICE, SYSTEM AND METHOD FOR SECURING AN ITEM

CROSS-REFERENCE TO RELATED APPLICATIONS

This application is a U.S. National Phase Application of PCT International Application No. PCT/IL2021/050167, International Filing Date Feb. 11, 2021, claiming the benefit of U.S. Provisional Patent Application No. 62/975,901, filed Feb. 13, 2020, which are hereby incorporated by reference.

FIELD OF THE INVENTION

The present invention relates generally to the field of securing an item by a device and, more specifically, to securing a purchase process by controlling a device attached to an item.

BACKGROUND

Retail or any activity of selling goods or products directly to consumers or end-users faces multiple challenges. Tagging items or products is commonly used for security reasons in order to prevent theft or stealing by customers. Tagging products is also used for tracking inventory and stock levels while minimizing the risk of loss and theft. Common tagging methods may use various technologies such as radio frequency identification (RFID), radio frequency (RF), Acoustic Magnetic (AM) or Electronic Product Code (EPC) system. The commonly used tags are usually made of durable and reusable materials, such as plastic, which offers cost-effective tagging solutions. However, the commonly used tags require a physical act of releasing the tag attached to a product prior to sale, usually at a check-out point. For example, a tag may be opened by using a strong magnet or other releasing device that requires a human intervention and may be cumbersome the check-out process. A smart tag that may be automatically released upon a payment transaction is highly required.

SUMMARY OF THE INVENTION

Some embodiments of the invention may include a method for a secured purchase process. The method may include encoding a device with a unique identification code related to a specific item, attaching the device to the item by a locking mechanism included in the device, receiving, by a receiver included in the device, a signal upon a completion of a payment transaction related to the unique identification code, enabling an unlocking movement of the locking mechanism upon receipt of the signal, and unlocking the locking mechanism to enable releasing the device from the item.

According to some embodiments of the invention, the signal is transmitted by a server associated with the payment transaction.

According to some embodiments of the invention, attaching the device to the item by the locking mechanism may further include locking a first element of the device to a second element of the device.

According to some embodiments of the invention, locking the first element of the device to the second element of the device may include fastening a locking nail protruding from the second element of the device to the first element of the device.

According to some embodiments of the invention, unlocking the locking mechanism may include releasing the locking nail from the first element of the device.

According to some embodiments of the invention, the unlocking movement of the locking mechanism may further include detaching the first element of the device from the second element of the device.

According to some embodiments of the invention, locking the first element of the device to the second element of the device may include covering the second element of the device and the first element of the device by a third element.

According to some embodiments of the invention, unlocking the locking mechanism may include inserting the device into a cradle.

According to some embodiments of the invention, the payment transaction is performed by one or more computer devices associated with the secured purchase process. The one or more computer devices are chosen from a group consisting of a mobile device, a self-checkout machine, a customer-activated terminal, a cash register machine, a customer relationship management (CRM) system, a self-payment machine, an unattended kiosk, and a cashier.

Some embodiments of the invention may include a device for a secured purchase process, which device may include an identification unit comprising a unique identification code related to a specific product, a locking mechanism for attaching the device to the product, and a receiver to receive a signal upon a completion of a payment transaction related to the unique identification code, wherein an unlocking movement of the locking mechanism for releasing the device from the item is enabled by the signal.

Some embodiments of the invention may include a device for a secured purchase process, which device may include a first element comprising a locking mechanism, a second element comprising a protruding nail to attach the first element to the second element and to an item, by insertion of the protruding nail into the locking mechanism, and a receiver to receive a signal upon a completion of a payment transaction, wherein an unlocking movement of the locking mechanism is enabled by the signal, and wherein the unlocking movement is configured to allow release of the protruding nail from the first element and releasing of the item from the device.

According to some embodiments of the invention, the device may include a motor and a rotating pin. The motor is configured to rotate the rotating pin upon receipt of the signal to allow the unlocking movement of the locking mechanism.

According to some embodiments of the invention, the locking mechanism may include one or more release levers, one or more plunger receivers, a locking cone and one or more metal balls to fasten the locking nail to the locking cone while being held by the one or more release levers when in locked position.

Some embodiments of the invention may include a cradle to allow the release of the item from the device when the device is located within the cradle.

According to some embodiments of the invention, the cradle comprises one or more push pins configured to push the one or more plunger receivers upon receiving the signal.

According to some embodiments of the invention, the unlocking movement may include applying force on the one or more release levers by the one or more plunger receivers and causing the one or more release levers to rotate, thereby enabling the locking cone to release the locking nail.

According to some embodiments of the invention, the device may include a motor to operate the one or more push pins upon a receipt of the signal.

According to some embodiments of the invention, the motor is configured to operate the one or more push pins based on a unique sequence related to a unique identification code of the device.

Some embodiments of the invention may include a method for a controlling releasing of a securing device, which method may include encoding a device with a unique identification, attaching the securing device to the item by a locking mechanism included in the device, wherein the locking mechanism is latched to the securing device by one or more release levers, upon a completion of a payment transaction, receiving a signal, wherein the signal comprises a command related to the unique identification, applying a force in a predetermined order on one or more plunger receivers included in the device to release the one or more release levers, wherein the predetermined order is based on the command, and unlatching the locking mechanism from the device to allow releasing of the device from the item.

According to some embodiments of the invention, the method may further include placing the device in a cradle, receiving the signal by the cradle and applying the force in the predetermined order by one or more pins included in the cradle.

BRIEF DESCRIPTION OF THE DRAWINGS

The subject matter regarded as the invention is particularly pointed out and distinctly claimed in the concluding portion of the specification. Embodiments of the invention, however, both as to organization and method of operation, together with objects, features and advantages thereof, may best be understood by reference to the following detailed description when read with the accompanied drawings. Embodiments of the invention are illustrated by way of example and not limitation in the figures of the accompanying drawings, in which like reference numerals indicate corresponding, analogous or similar elements, and in which:

FIGS. 3A and 3B are schematic views of an exemplary securing device according to some embodiments of the invention;

FIG. 6 is a schematic cross-section view of an exemplary securing device and an exemplary docking device according to some embodiments of the invention;

FIGS. 8A and 8B are schematic partially transparent and exploded views of an exemplary securing device according to some embodiments of the invention.

Figure 1:
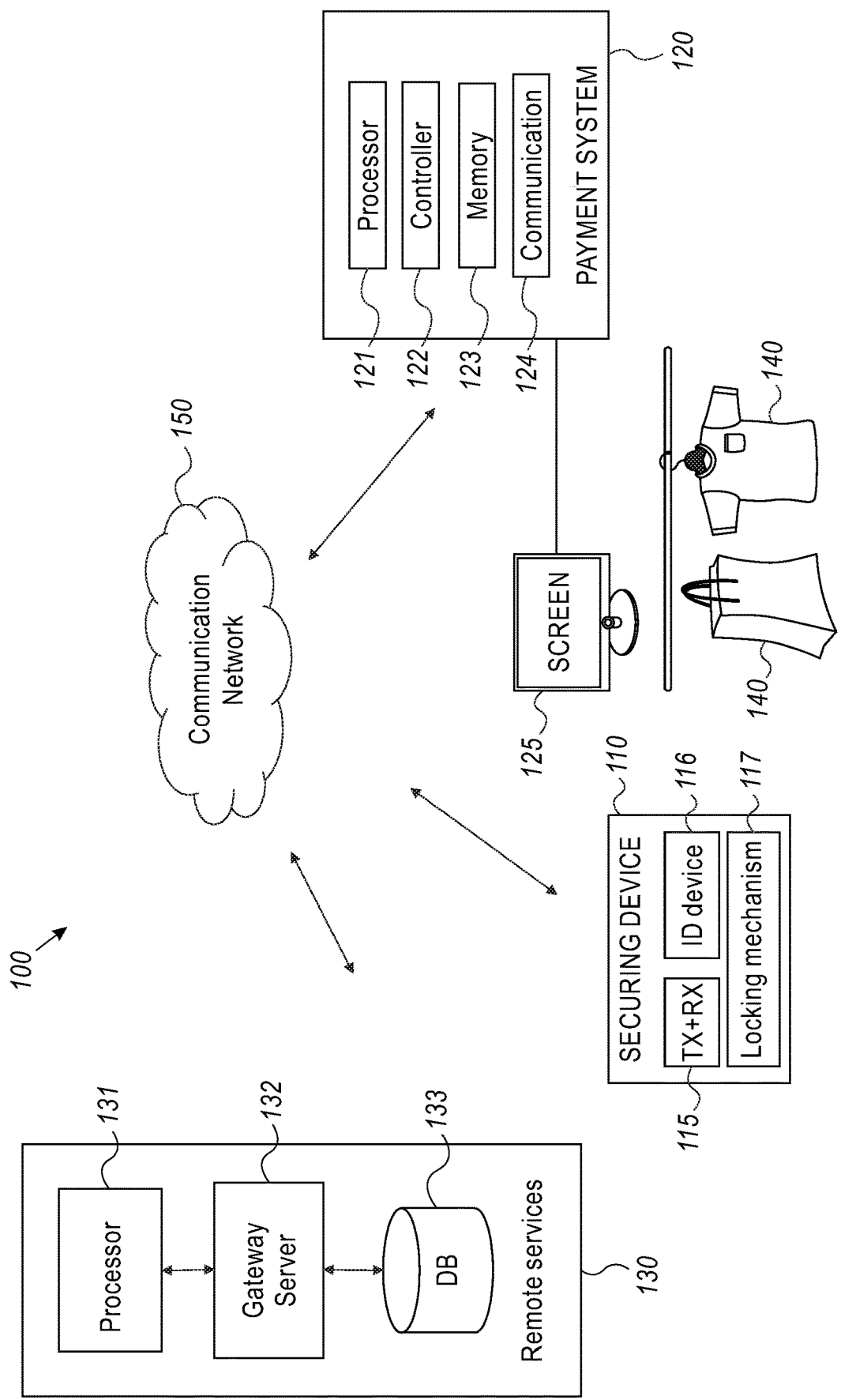
FIG. 1 is a schematic illustration of a system in accordance with some embodiments of the invention.

It will be appreciated that, for simplicity and clarity of illustration, elements shown in the figures have not necessarily been drawn to scale. For example, the dimensions of some of the elements may be exaggerated relative to other elements for clarity. Further, where considered appropriate, reference numerals may be repeated among the figures to indicate corresponding or analogous elements.

DETAILED DESCRIPTION OF THE INVENTION

In the following description, various aspects of the present invention will be described. For purposes of explanation, specific configurations and details are set forth in order to provide a thorough understanding of the present invention. However, it will also be apparent to one skilled in the art that the present invention may be practiced without the specific details presented herein. Furthermore, well known features may be omitted or simplified in order not to obscure the present invention.

Although some embodiments of the invention are not limited in this regard, discussions utilizing terms such as, for example, "processing," "computing," "calculating," "determining," "establishing", "analyzing", "checking", or the like, may refer to operation(s) and/or process(es) of a computer, a computing platform, a computing system, or other electronic computing device that manipulates and/or transforms data represented as physical (e.g., electronic) quantities within the computer's registers and/or memories into other data similarly represented as physical quantities within the computer's registers and/or memories or other information transitory or non-transitory or processor-readable storage medium that may store instructions, which when executed by the processor, cause the processor to execute operations and/or processes. Although embodiments of the invention are not limited in this regard, the terms "plurality" and "a plurality" as used herein may include, for example, "multiple" or "two or more". The terms "plurality" or "a plurality" may be used throughout the specification to describe two or more components, devices, elements, units, parameters, or the like. The term "set" when used herein may include one or more items unless otherwise stated. Unless explicitly stated, the method embodiments described herein are not constrained to a particular order or sequence. Additionally, some of the described method embodiments or elements thereof can occur or be performed in a different order from that described, simultaneously, at the same point in time, or concurrently.

According to some embodiments of the invention, a secured self-checkout process may include releasing a smart device or tag from an item or product only upon a completion of a payment transaction and preventing any releasing of the smart tag in an unsafe or unauthorized manner. Some embodiments of the invention may further allow automatic capabilities of in-store analytics, inventory management and tracking location of an item. Some embodiments of the invention may enable a secured, reliable, and controllable check out process by using a smart securing device. One aspect of the present invention may provide a system and method which may prevent an unauthorized releasing of a device from an item to which the device is attached or connected to and may allow a secured check-out process of a retail experience.

Reference is made to FIG. 1, which is a schematic illustration of a system in accordance with some embodiments of the invention. System 100 may be used to ensure a secured purchase process of one or more items or products 140. System 100 may include a securing device 110, a payment system 120 and remote services 130, all connected via one or more communication networks 150. Securing device may be attached to one or more items 140. According to some embodiments of the invention, item 140 may be any item, product, object or element that may be offered for sale, e.g., in a shopping or a retail facility such as a shop, a shopping mall, a department store and the like. Although some embodiments of the invention may describe item 140 as an item that may be offered for sale, it should be understood to a person skilled in the art that item 140 may be any item, object, element or product that may require a secured handling and identification. Securing device may include an identification (ID) device or unit 116, a transceiver 115 and a locking mechanism 117. ID unit 116 may include a unique identification code or barcode related to a specific product, item or type of products or items. The unique identification code may be any number, string, information or other unique data which may be encoded by an external device or embedded within the ID unit prior to a retail process of item 140. The be unique identification code may be used for tracking and identifying items.

Transceiver 115 may comprise both a transmitter and a receiver able to transmit and receive analog or digital signals, e.g., via one or more communication networks 150. It should be understood to a person skilled in the art that transceiver 115 may be implemented as a single device unit, module or element which includes a receiver and a transmitter, or as separate units, modules or elements of a receiver and a transmitter. Transceiver 115 may include other modules or element such as an antenna or any other hardware or software which may allow transmitting and receiving of analog or digital signals as known in the art. For example, transceiver 115 may be used for receiving the unique identification code during encoding process prior to the retail process of item 140, for communication via communication network 150 with a remote service 130 or payment system, e.g., to receive a signal upon a completion of a successful payment transaction, also referred to herein as "indication signal".

Transceiver 115 may utilize one or more communication protocols or method which may be supported by communication network 150, for example, Near Field Communication (NFC), Radio-Frequency identification (RFID), Bluetooth low energy (BLE), Long area (LoRa) network, ZigBee, WiFi, cellular network, Ultra-wideband (UWB), magnetic system, Acousto-magnetic system, Radio frequency systems and Electro-magnetic system. Encoding device 110 with a unique identification may include encoding transceiver 115 by using one or more communication methods or protocol utilized by transceiver 115.

Locking mechanism 117 may be included in securing device 110 and may be used for attaching securing device 110 to item 140 before item 140 may be offered for sale to shoppers or clients. Some embodiments of the invention may include a plurality of locking mechanism that may be implemented by locking mechanism 117 and may offer a plurality of attachments or connection types, forms and methods as described in detail in embodiments of the invention. In some embodiments of the invention, securing device 110 may include a plurality of parts, components, sections, elements or pieces, and the locking mechanism may be embedded in one or more of the parts comprising securing device 110.

According to some embodiments of the invention, attaching device 110 to item 140 may be performed or achieved by locking mechanism 117, e.g., locking a first element of device 110 to a second element of device 100 by locking mechanism 117. Unlocking movement of locking mechanism 117 may include separating or detaching of a first element of device 110 from a second element of device 110. The unlocking movement of locking mechanism 117 may release item 140 from securing device 100.

Payment system 120 may be any computerized system that may allow performing a payment transaction. Payment system 120 may be connected to a screen 125 in a wireless or wired connection to allow a user to perform and complete a payment transaction, e.g., when buying item 140 in a shop or store. In some embodiments of the invention, screen 125 may be connected to payment system 120, while in other embodiments of the invention, screen 125 may be embedded or included in payment system 120. According to some embodiments of the invention, a payment transaction may be performed by payment system 120 that may be associated with a secured purchase process allowing the payment transaction. Payment system 120 may be, for example, a mobile device, a self-checkout machine, a customer-activated terminal, a cash register machine, a customer relationship management (CRM) system, a self-payment machine, an unattended kiosk, a cashier or any other payment system.

Payment system 120, may include a processor 120, a controller, a memory 123 and a communication module 124. Other modules, elements or units may be included in host device 120. It should be understood to a person skilled in the art that the units or modules included in payment system 120 may be separated, e.g., payment system may be implemented in one or more location, e.g., one or more of the units may be located in a first location while other units may be located in a second location. For example, if the payment transaction is performed by an application running on a mobile phone of a customer, payment system 120 may include the mobile phone and a dedicated server which may be associated with the application and may communicate with the mobile phone.

Remote services 130 may include one or more services separated from payment system 120 and may connect to payment system 120 and/or to device 110 by one or more communication network 150. Remote services 130 may include, for example, a remote processor 131, a gateway server 132 and a database 133. Any other device, service or platform may be included in remote services 130. Any of the components included in system 100 may be the example computer system shown in FIG. 9, and any of the operations described with relation to system 100 may be performed, for example, by the example computer system shown in FIG. 9.

Communication network 150 may include one or more communication networks and may connect among remote services 130, securing device 110 and payment system 120. Communication network 150 may include, for example, a local area communication network (LAN) that interconnects computers within a limited area, and a wide area communication network (WAN) that covers a larger geographic distance. For example, communication network 150 may include one or more wired or wireless communication networks or communication technologies such as for example, Internet, Wi-fi, Ethernet, Near Field Communication (NFC), Radio-Frequency communication (RF), Bluetooth low energy (BLE), Long area (LoRa) network, ZigBee, cellular network, Ultra-wideband (UWB) network, magnetic communication system, Acousto-magnetic communication, or any other communication network.

In some embodiments of the invention, database 133 may include data or information related to a plurality of securing device 110, e.g., devices used in a certain shop. The data related to devices 110 may include, for example, a list or table of a plurality of securing devices 110 attached to a plurality of items 140 and their unique identification codes. Database and/or server 132 may store a status of each of the plurality of devices 110, e.g., if device 110 is locked or open, and may communicate with payment system 120 by communication messages as known in the art. During a payment transaction, e.g., of item 140, device 110 that is attached to item 140 may be recognized by payment system 120. For example, if device 110 includes an RFID tag or chip, payment system 120 may include an RFID reader which may receive the unique identification code of item 140, and a presentation of the item may be displayed to a buyer on screen 125. The presentation of the item may include, for example, a name or description of item 140 and a price of item 140. Other information related to item 140 may be identified and presented to a buyer.

Upon a completion of a payment transaction of item 140, payment system 120 may send a payment indication to gateway server 132 by communication module 124 via communication network 150. Gateway server 132 may send a signal to device 110, directly or via payment system 120, which may allow opening or releasing of locking mechanism 117 of device 110, as described in embodiments of the invention.

Figure 2:
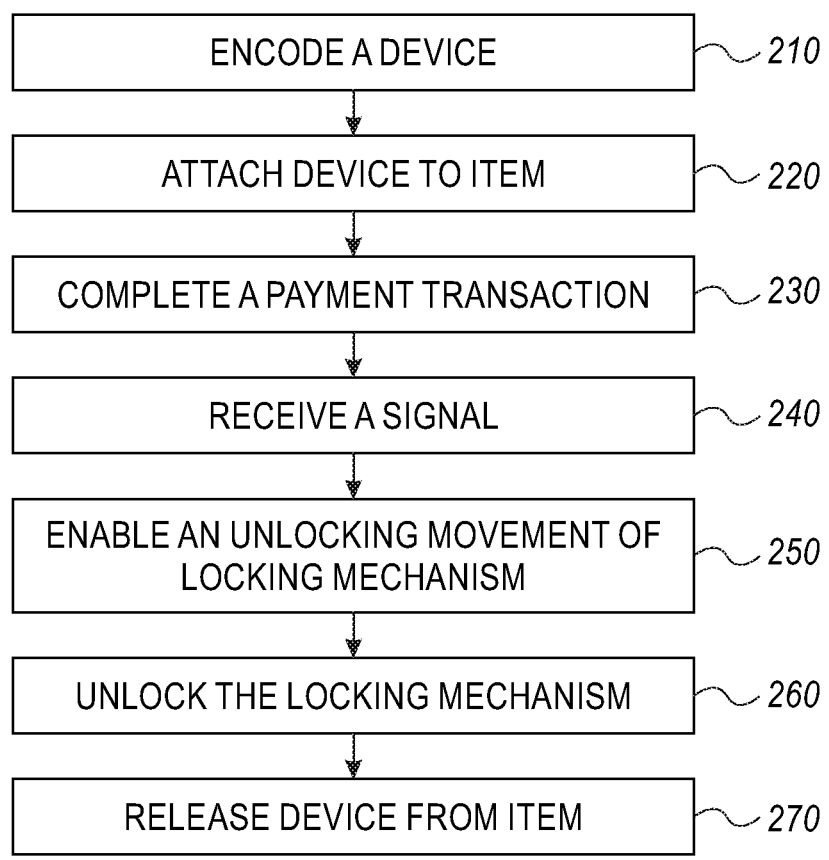
FIG. 2 is a flowchart of a method for a secured purchase process according to some embodiments of the invention.

FIG. 2 is a flowchart of a method for a secured purchase process according to some embodiments of the invention. Some embodiments of a method for secured purchase process may be performed, for example, by the system shown in FIG. 1. As with other method flowcharts, operations of FIG. 2 may be used with operations in other flowcharts shown herein in some embodiment of the invention.

In operation 210, a device, e.g., securing device 120 of FIG. 1, may be encoded with a unique identification code related to a specific product or item which may be offered for sale. Encoding the device with the unique identification code may be performed prior to offering the item or product for sale. In some embodiments, the unique identification code may be related to a type of product, and a same unique identification code may be encoded in a plurality of devices attached to a plurality of items or products of a same type. The unique identification code may be stored in a database along with all information related to a specific item or product which may be attached to the device encoded with the unique identification code. Storing and tracing a status of unique identification code may enable tracking of the item which may be attached to the device encoded with the unique identification code.

Some embodiments of the invention may allow identifying a product based on the unique identification code which may tracking of an item for a plurality of utilization, e.g., inventory management, real-time inventory visibility, automatic update of a location of a product, in-store analytics and the like. For example, inventory management may include automatically updating an inventory database in an associated database, e.g., database 133 of FIG. 1. Tracking a location of an item may be enables by including positioning technology, e.g., Global Positioning System (GPS) or any other known in the art technology.

In operation 220, the device may be attached to an item or a product by a locking mechanism included in the device. For example, locking mechanism 117 of FIG. 1 may be used to attach securing device 100 to item 140 of FIG. 1. The operation of attaching a securing device to an item may be performed prior to offering the item for sale. Some embodiments of the invention may include a plurality of attachments or connection types, forms and methods. For example, a first element of device 110 of FIG. 1 may be locked, connected, attached or secured to a second element of device 100 by locking mechanism 117.

In some embodiments of the invention, attaching the device to an item by the locking mechanism may include locking a first element of the device to a second element of the device by fastening a locking nail protruding from the second element of the device to the first element of the device. For example, the second element of the device may include a protruding nail to attach said first element to said second element and to an item, by insertion of the protruding nail into the locking mechanism included in the first element of the device. In other embodiments, locking a first element of the device to a second element of the device may include covering the second element of the device and the first element of the device by a third element, e.g., a covering element, which may keep the first and second elements fastened to each other and to an item between the first and the second elements.

In some embodiments of the invention, locking a first element of the device to a second element of the device by fastening a locking nail protruding from the second element of the device to the first element of the device is enabled by a locking mechanism that may include one or more metal balls that fasten the locking nail to a locking cone while the locking cone may be held by one or more release levers when in locked position, as described in detail in FIG. 3-5.

In operation 230, a payment transaction related to a unique identification code may be completed. A unique identification code of a device 110 may be scanned or read by payment system 120 of FIG. 1, and a payment transaction may be completed by, for example, a credit card payment, internet transaction payment, cash payment or any other payment method. For example, an item is scanned and identified by a payment system before payment based on its identification code and a payment is performed. A confirmation of a successful payment transaction may be transmitted by the payment system to a server associated with the payment transaction, e.g., by a software development kit (SDK) or an application programming interface that may communicate between payment system 120 and gate way server 132 of FIG. 1.

In operation 240, a signal indicating that a payment transaction is completed may be received, by a receiver included in the securing device, e.g., by transceiver 115 of device 100 of FIG. 1. The indication signal may be transmitted by a server or a computer device associated with the payment transaction, e.g., by server 132 or payment system 120 of FIG. 1. The indication signal may be transmitted upon a completion of a payment transaction related to a unique identification code of a specific securing device that is attached to an item paid during the payment transaction. The signal transmitted upon a completion of a payment transaction may include a command or a code related to the unique identification, which may allow or may used to release the device from the item is attached to.

The indication signal may be transmitted upon a successful payment transaction which may be performed by one or more computer devices associated with the secured purchase process. For example, the secured purchase process may be performed by at least one of the following devices: a mobile device, a self-checkout machine, a customer-activated terminal, a cash register machine and a customer relationship management (CRM) system, a self-payment machine, an unattended kiosk, and a cashier. Some embodiments of the invention may include a receiver to receive a signal upon a completion of a payment transaction related to the unique identification code. The receiver may be included in a securing device attached to an item for sale, e.g., device 110 of FIG. 1 or included in a docking station or a cradle in which the securing device that is attached to an item for sale may be inserted during a payment transaction.

In operation 250, an unlocking movement of the locking mechanism may be enabled upon a receipt of a signal indicating that a payment transaction is completed. According to some embodiments of the invention, receipt of a signal indicating a completion of a successful payment transaction may enable a change in a position of the locking mechanism, e.g., locking mechanism 117 of FIG. 1. For example, a change in a position of the locking mechanism may include a change, an alteration, or a movement of one or more parts, components or elements of the securing device, which may allow an unlocking movement of the locking mechanism. The locking mechanism may be locked until a receipt of an indication signal. Upon a receipt of an indication signal, a first movement or a change in the securing device 110 may be enabled, become possible or permitted, which may allow unlocking of the locking mechanism. For example, an unlocking movement of the locking mechanism may be enabled by the signal and may allow releasing of a protruding nail of a second element of the securing device from a first element of the securing device and releasing an item from the securing device.

In some embodiments of the invention, receipt of an indication signal may trigger or operate a motor which may move an element to enable unlocking of the locking mechanism. In some embodiments of the invention, the indication signal may include information based on which an unlocking of the locking mechanism may be accomplished. An exemplary unlocking movement of the locking mechanism may lead to detaching a first element of the device from a second element of the device.

In operation 260, the locking mechanism may be unlocked by, for example, by separating a first element of the securing device 110 from a second element of the securing device 110. Unlocking the locking mechanism may enable releasing of the device from the item. For example, unlocking the locking mechanism may include releasing a locking nail protruding from a second element of the device from a first element of the device.

In some embodiments of the invention, unlocking the locking mechanism may require a use of an additional, external element, such as a cradle or frame in which device 110 may be inserted. In some embodiments of the invention, unlocking the locking mechanism may include insertion of the device into a cradle. Operations required for unlocking the locking mechanism are described with reference to embodiments of the invention, e.g., with reference to FIGS. 5-8.

In operation 270, the securing device may be released from the sold item after unlocking, releasing or opening of locking mechanism. The release of the securing device from the item may allow a buyer or shopper who performed a payment transaction to receive the purchased item and to leave the shop. Prior to release of the securing device from the item, a shopper may not leave the store with the item, as the device may serve as a security device, e.g., the device may be identified based on its unique identification code by an identification technology embedded in a gate, door or exit of a shop, as known in the art.

Reference is now made to FIGS. 3A and 3B, which are schematic views of an exemplary securing device, according to some embodiments of the invention. Securing device 300 may be, for example, securing device 100 of FIG. 1, and its locking mechanism which is described in FIGS. 3-8 may be, for example, locking mechanism 117 of FIG. 1. Securing device 300 may comprise a first element or component 320 and a second element or component 330. Component 320 may be referred to herein as "top element" or "cover element", while component 330 may be referred to herein as "bottom element" or "base element". Top element 320 may be secured or attached to base element 330, and a product or an item, e.g., item 140 of FIG. 1 may be placed between top element 320 and base element 330 such as to be attached, fastened, clipped or secured to securing device 300. Top element 320 and base element 330 may be also connected or linked by a strap 322, which may be elastic or flexible.

Securing device 300 may further include a locking nail 325 protruding from a first element, e.g., element 320 of device 300. Locking mechanism of device 300, e.g., locking mechanism 117 of FIG. 1, may require locking the top element 320 to the base element 330 by, for example, fastening locking nail 325 protruding from top element 320 to base element 330. Unlocking the locking mechanism may include releasing locking nail 325 from base element 330. Releasing locking nail 325 from base element 330 may be performed upon receipt of a signal indicating a completion of a successful payment transaction. In some embodiments of the invention, unlocking movement of the locking mechanism may be enabled by the indication signal and by inserting device 300 into a docking station or a cradle 310. Cradle 310 may allow the unlocking process of the locking mechanism and the releasing of an item from device 300 when the device 300 is located within cradle 310. Cradle 310 may include a charging port 315 which may use for charging or for voltage supply to cradle 310 and/or to device 300 while inserted into cradle 310.

Figure 3C:
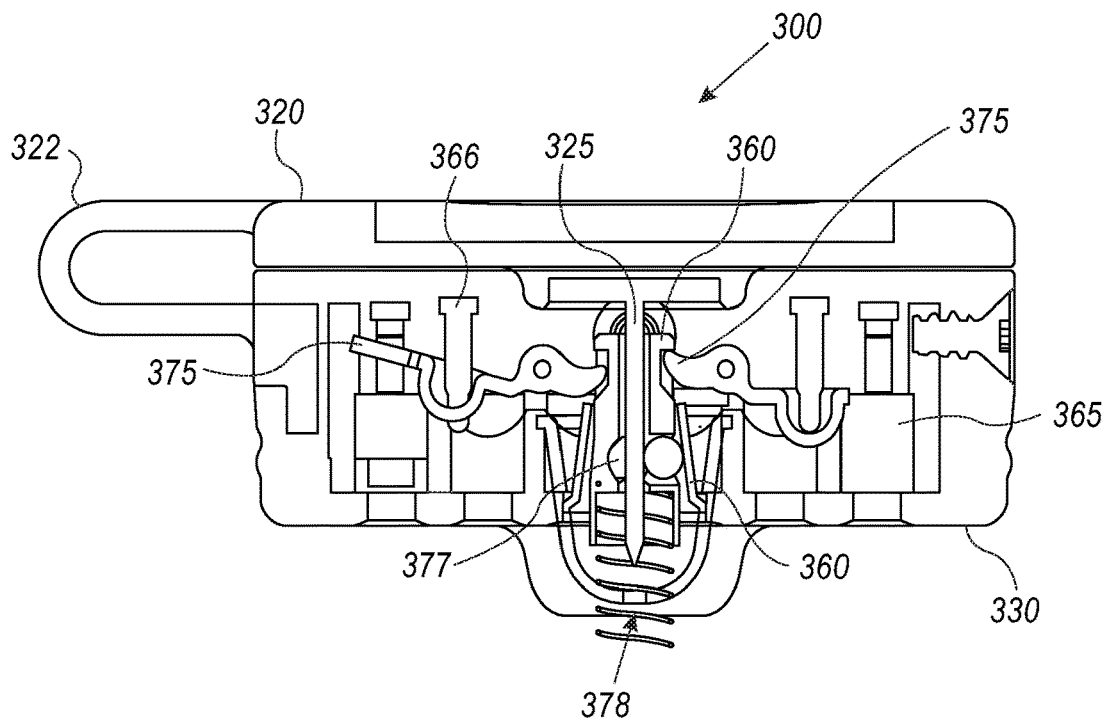
FIG. 3C is a schematic side cross-section of an exemplary securing device according to some embodiments of the invention.

Reference is now made to FIG. 3C, which is a schematic side cross-section of an exemplary securing device, according to some embodiments of the invention. FIG. 3C shows a side cross section of device 300 of FIGS. 3A-3B. Bottom element 330 may include a locking cone 360, one or more plunger receivers 365, one or more plungers 366, one or more release levers 375, one or more metal balls 377 and a spring 378, which may be included in locking mechanism 117 of FIG. 1 and in the locking/unlocking process of device 300.

Locking nail 325 may protrude from cover element 320 and may be held or fastened by locking cone 360, metal ball 377 and locking cone 360 to allow locking of top element 320 to base element 330. When in lock position, one or more metal balls 377 may fasten locking nail 325 to locking cone 360 while being held or latched by one or more release levers 375. According to some embodiments of the invention, an unlocking movement may include applying force on one or more release levers 375 by one or more plunger receivers 365, thereby causing release levers 3735 to rotate while enabling locking cone 360 to move towards spring 378 and to release locking nail 325 as further explained in detailed in FIGS. 4-5.

Figure 3D:
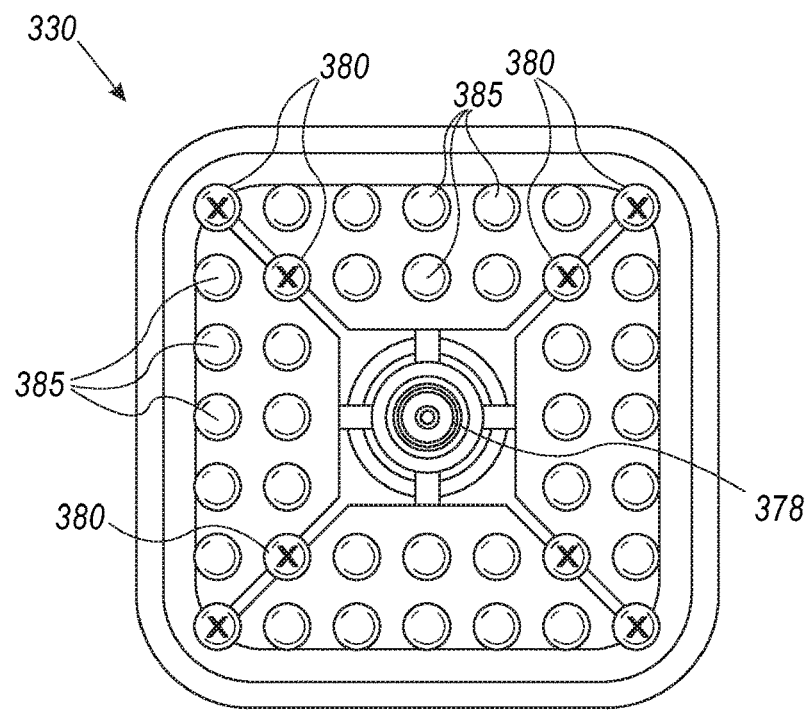
FIG. 3D is a schematic bottom view of an exemplary securing device according to some embodiments of the invention.

FIG. 3D is a schematic bottom view of an exemplary securing device, according to some embodiments of the invention. FIG. 3D shows a schematic bottom view of device 300 of FIGS. 3A-3C. Base element 330 may include a plurality of push pins receivers 385 and a plurality of contact pins 380. Contact pins 380 may be used for contact with an external electrical element such as cradle 310. In some embodiments, one or more of the contact pins may be used for orientation and, therefore, may be marked in order to enable a correct positioning of device 300 inside cradle 310. Push pins receivers 385 may be pushed from below by push pins arise from cradle 310 which may apply force on interior elements included in bottom element 330, e.g., on one or more plunger receivers 365. Push pins receivers 385 may allow insertion of pushing pins from below, which may push plunger receivers 365 at a specific sequence or order according to the unique identification code related to the device 300. Pushing up of plunger receivers 365 in a correct order may allow an unlocking movement of locking mechanism. Bottom view of device 300 may further show spring 378 from below.

Figure 4A:
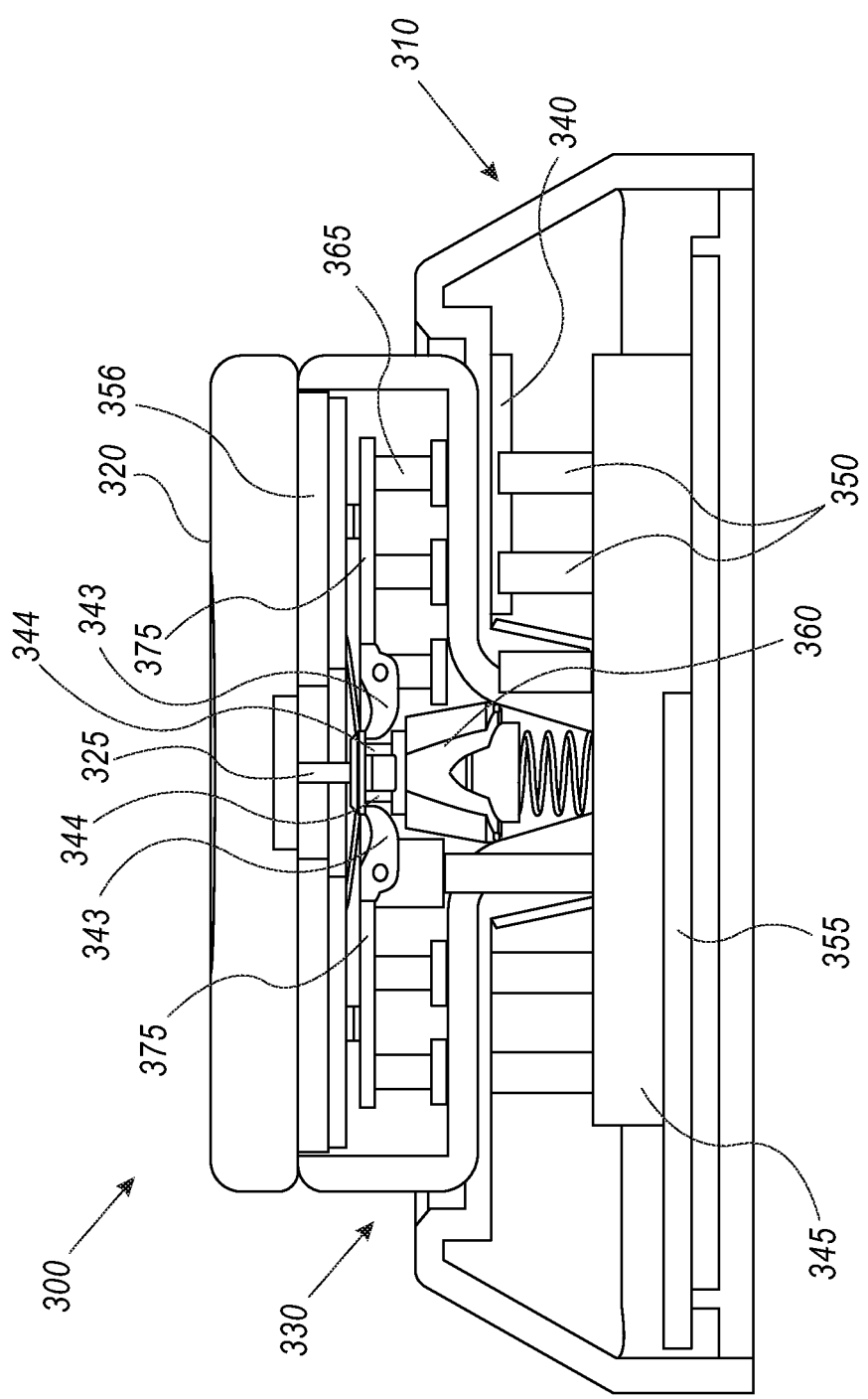
FIGS. 4A and 4B are schematic cross-section views of an exemplary docking device and an exemplary securing device according to some embodiments of the invention.
Figure 4B:
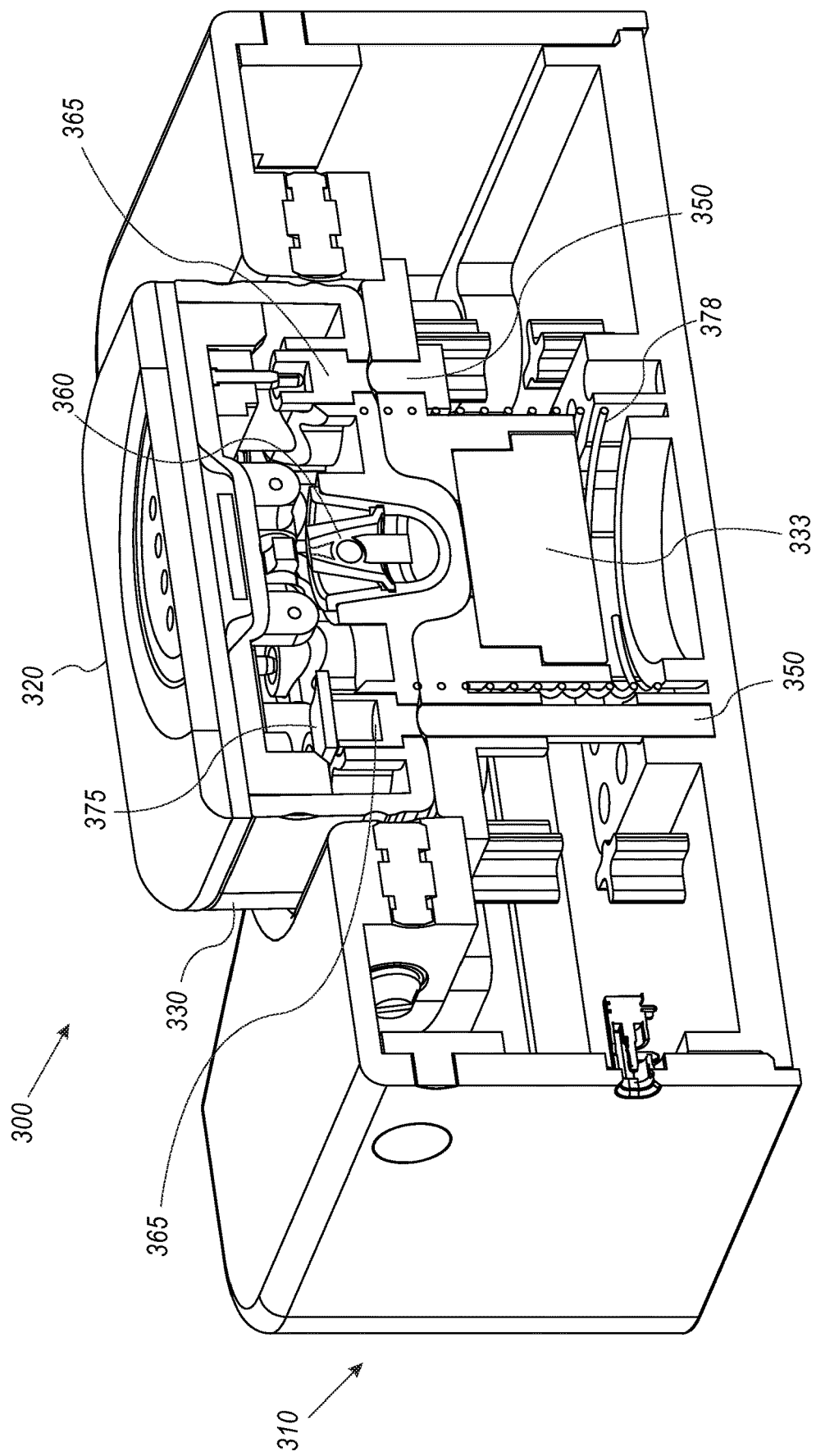

FIGS. 4A and 4B are schematic cross-section views of an exemplary docking device and an exemplary securing device, according to some embodiments of the invention. FIGS. 4A and 4B shows a side cross section of device 300 while positioned inside cradle 310. As shown in FIGS. 4A and 4B, locking cone 360 may be latched or fastened by one or more release levers 375. A first side or a "head" 343 of each of the release levers 375 may have a special shape which may fit into one or more slits 344 at an upper side of locking cone 360. Each of the heads 343 of the one or more release levers 375 may be positioned in slit 344 by force of one or more plunger 366 in a locking position, as shown in FIG. 3C. When in locking position, cone 360 may be lifted up by release levers 375 allowing metal balls 377 to cling to locking nail 325 while fastening locking nail 325 to cone 360. As shown in FIG. 4C, locking position of cone 360 may prevent metal balls 377 from moving towards magnet 333 and may apply a mechanic force which may resist the magnetic force applied by magnet 333 on metal balls 377.

According to some embodiments of the invention, bottom element 330 may further include a board or surface 356, e.g., a printed circuit board (PCB), which may mechanically support and electrically connect one or more electronic components. Board 356 may include, for example, ID unit 116 and/or transceiver 116 of FIG. 1.

Cradle 310 may include a communication unit 355, an ID reader unit 340, a motor 345 and a plurality of push pins 350. Motor 345 may operate one or more push pins 350 configured to push, drive and apply force on one or more plunger receivers 365 upon receipt an indication signal of a successful payment transaction. When device 300 may be positioned into cradle 310, ID reader unit 340 may receive transmission from ID unit 116 of device 300 and may identify the identification code of device 300. Communication unit 355 may be implemented by for example, a printed circuit board (PCB) which may mechanically support and electrically connect one or more electronic components. Communication unit 355 may include (not shown) a transceiver, e.g., transmitter and receiver and a controller. Communication unit 355 may communicate with external computing device associated with the payment transaction, e.g., payment system 120 and/or gateway server 132 of FIG. 1.

In some embodiments of the invention, transceiver of communication unit 355 may receive an indication signal indicating that a device 300 having a specific identification code may be opened or released. Communication unit 355 may compare the identification code received from the computing device associated with the payment transaction to the identification code identified by ID reader unit 340, and when the identification codes are identical, motor 345 may be enabled. The indication signal may further include a unique sequence related to a unique identification code of the device and a command to operate motor 345 according to the unique sequence. Upon a completion of a payment transaction, motor 345 may operate one or more push pins 350 based on a unique sequence related to the unique identification code of device 300. Push pins 350 may apply force in a predetermined order on one or more plunger receivers 365 to release one or more release levers 375. Applying force by a plurality of push pins 350 in a predetermined order related to the unique identification code of device 300 may allow unlatching locking mechanism of device 300 to allow releasing of device 300 from an attached item.

Figure 5A:
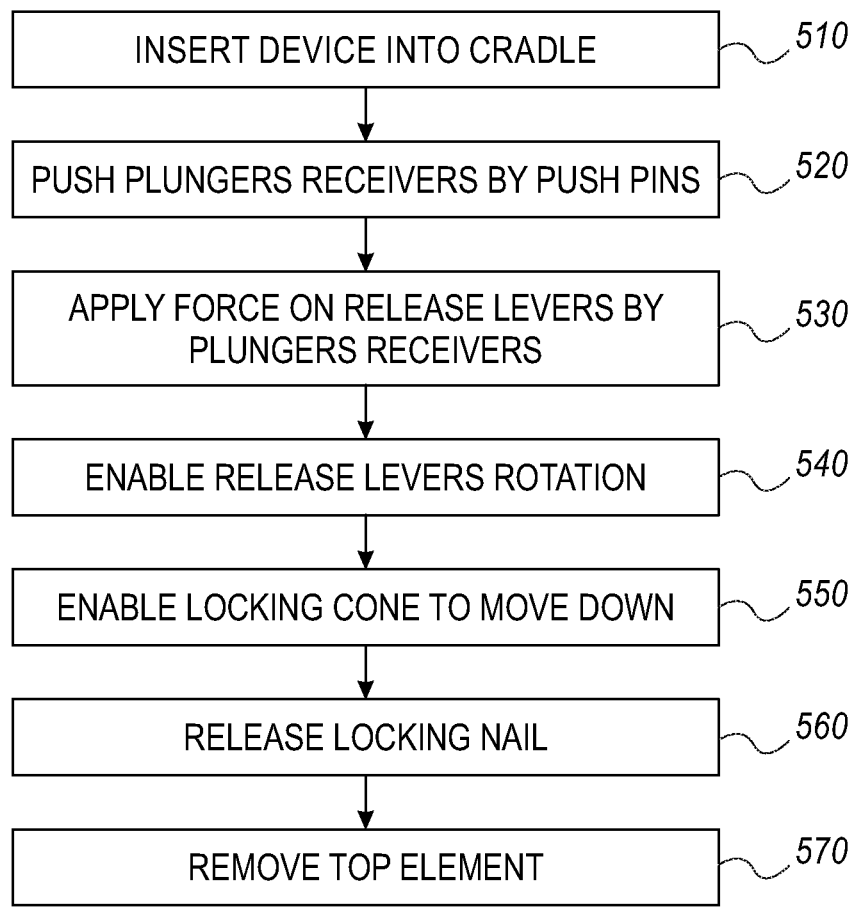
FIGS. 5A and 5B are schematic side cross-sections of an exemplary securing device at first and second positions according to some embodiments of the invention.
Figure 5C:
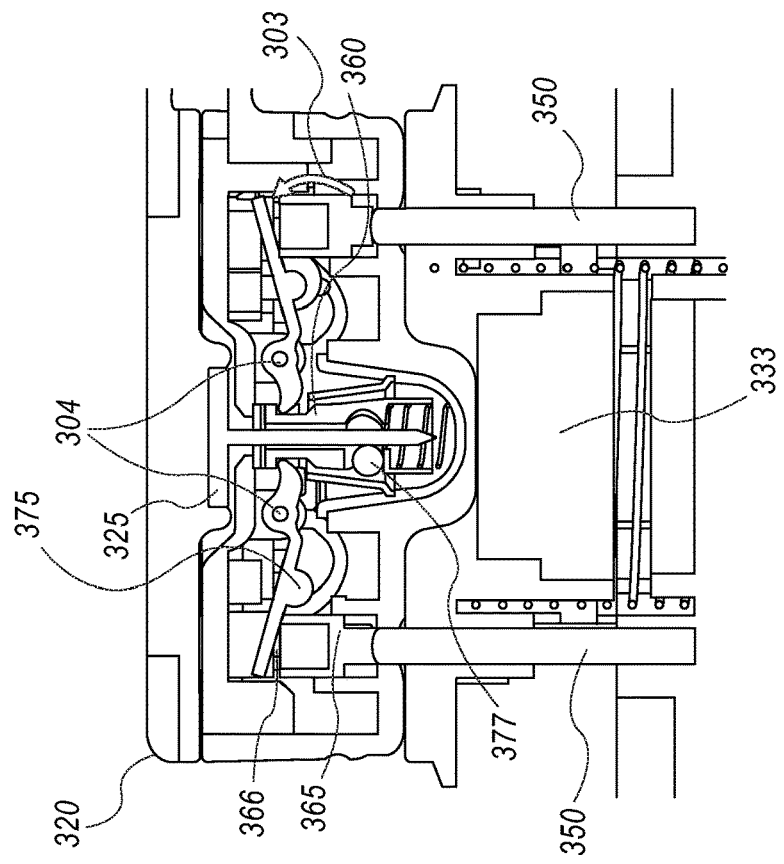
FIG. 5C is a flowchart of a method for unlocking an exemplary securing device according to embodiments of the invention.
Figure 5B:
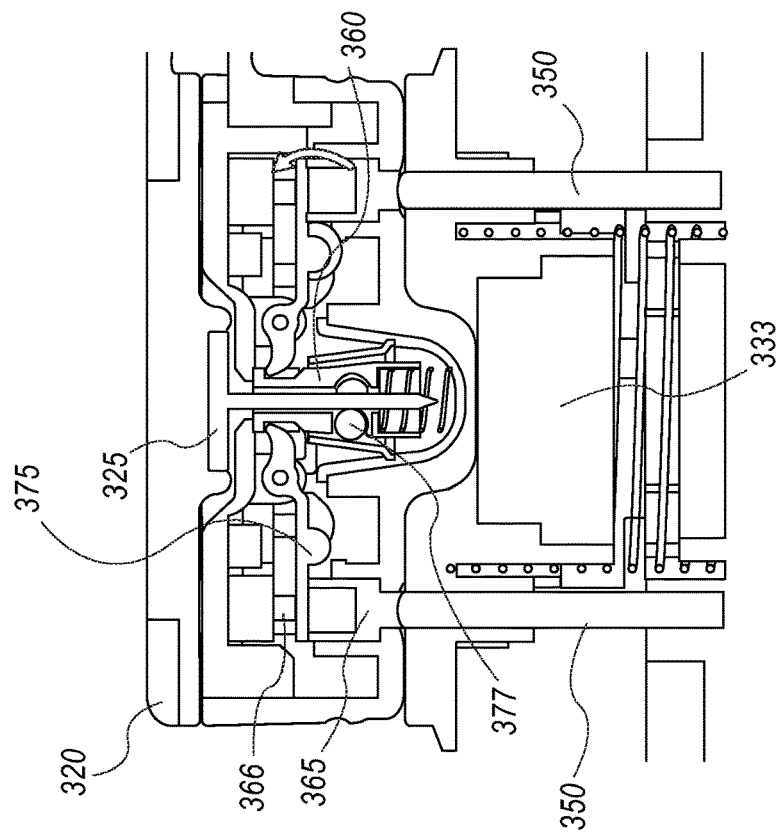

Reference is now made to FIGS. 5A and 5B, which are schematic side cross-sections of an exemplary securing device at a first and a second positions, according to some embodiments of the invention. Reference is also made to FIG. 5C, which is a flowchart of a method for unlocking an exemplary securing device according to some embodiments of the invention. Some embodiments of a method for unlocking an exemplary securing device may be performed, for example, by the system shown in FIGS. 5A and 5B.

In operation 510, a device 300 may be inserted or placed into cradle 310 in order to release top element 320 from base element 330 and further in order to release an item (not shown) which may be attached to device 300, e.g., between top element 320 and base element 330. An item may be attached to securing device 300 by a locking mechanism included in the device, e.g., locking cone, locking nail 325 and metal balls 377. The locking mechanism may be latched to securing device 300 by one or more release levers 375 when in a locked position shown in FIG. 5A. Upon a completion of a payment transaction, device 300 and/or cradle 310 may receive an indication signal, including a command related to the unique identification of device 300. Upon verification by cradle 310 that opening of device 300 may be allowed, an unlocking movement may be enabled as described in operations 520-570.

In operation 520, plunger receivers 365 may be pushed by one or more push pins 350 included in cradle 310. Push pins 350 may apply force on one or more plunger receivers 365 according to a predetermined order based on the command received, for example, from a computing device associated with the payment transaction. The command may include a unique sequence based on which a specific set of push pins 350 may be selected and may apply force in a predetermined order on one or more plunger receivers 365. Each of device 300 may receive a unique sequence to allow opening only of the specific device. The force applied by push pins 350 may arrive from below plunger receivers 365 and may be driven by motor 345.

In operation 530, plunger receivers 365 may apply force on release levers 375, while being pushed by push pins 350 as shown in FIG. 5C

In operation 540, the force applied on release levers 375 may enable a rotation of release levers 375, as shown by arrow 303. The force may be applied on an end of release levers 375 opposite to the head of release levers 375 to allow a rotation of release levers 375 around a hinge or pivot 304.

In operation 550, the rotation of release levers 375 may enable locking cone 360 to move down towards magnet 333 and spring 378. The rotation of release levers 375 may unlatch the locking mechanism from device 300 and may allow the magnetic force of magnet 333 to pull or attract metal balls 377.

In operation 560, locking nail 325 may be released from bottom element 330. A rotation of release levers 375 may allow releasing of locking cone from a locked position which may allow the magnetic force of magnet 333 to pull or attract metal balls 377 allowing a release of locking nail from the grip of metal balls 377.

In operation 570, top element 320 may be removed and released from bottom element 330, thereby allowing release of device 300 from an item attached to it.

Reference is now made to FIG. 6, which is a schematic cross-section view of an exemplary securing device and an exemplary docking device, according to some embodiments of the invention. A securing device 600 may be, for example, securing device 100 of FIG. 1, and its locking mechanism may be, for example, locking mechanism 117 of FIG. 1. Securing device 600 may comprise a first element or component 620 and a second element or component 630. Component 620 also referred to herein as "top element" or "cover element", while component 630 may be referred to herein as "bottom element" or "base element". When top element 620 may be secured or attached to base element 630, an item, e.g., item 140 of FIG. 1 may be placed between top element 620 and base element 630 as to be attached or secured to securing device 600.

Securing device 600 may further include a locking nail 625 protruding from top element 620 and fastened or secured by locking mechanism 660, e.g., locking mechanism 117 of FIG. 1. Locking mechanism 660 may include similar elements as locking mechanism described with reference to FIGS. 3-5. Securing device 600 may include a motor 690, a rotating pin 695 and a board or surface 656, e.g., a printed circuit board (PCB) which may mechanically support and electrically connect one or more electronic components. Board 656 may include, for example, ID unit 116 and/or transceiver 116 of FIG. 1. Securing device 600 may further include a battery to provide or supply motor 690 with electrical power, e.g., DC voltage. In some embodiments, the power to motor 690 may be supplied by cradle 610. According to some embodiments of the invention, cradle 610 may include an ID reader unit 640 and a communication unit 655 which may be similar to ID reader unit 340 and communication unit 355 of cradle 310, respectively, as described in other embodiments of the invention.

Communication unit 655 may communicate with external computing device associated with the payment transaction, e.g., payment system 120 and/or gateway server 132 of FIG. 1. Transceiver included in communication unit 655 may receive an indication signal indicating that a device 600 having a specific identification code may be opened or released. Communication unit 355 may compare the identification code received from the computing device associated with the payment transaction to the identification code identified by ID reader unit 640, e.g., the included in ID unit of device 600. If the identification codes are identical, communication unit 655 may send an operating signal to motor 690. When operated, motor 690 may be configured to rotate rotating pin 695 upon receipt of the indication signal to allow the unlocking movement of the locking mechanism.

Unlocking movement is configured to allow release of the protruding nail from the first element and releasing of the item from the device. unlocking of locking mechanism 660 may include releasing locking nail 625 from base element 630 and releasing an item attached to device 600. Releasing locking nail 625 from base element 630 may be performed upon receipt of a signal indicating a completion of a successful payment transaction and by inserting device 600 into a cradle 610.

Reference is made to FIGS. 7A, 7B, 7C and 7D, which are schematic cross-section views of an exemplary securing device, according to some embodiments of the invention. A securing device 700 may be, for example, securing device 100 of FIG. 1, and its locking mechanism may be, for example, locking mechanism 117 of FIG. 1. Securing device 700 may comprise a first element or component 720 and a second element or component 730. Component 720 also referred to herein as "top element" or "cover element", while component 730 may be referred to herein as "bottom element" or "base element". When top element 720 may be secured or attached to base element 730, an item, e.g., item 140 of FIG. 1 may be placed between top element 720 and base element 730 so as to be attached or secured to securing device 600. Locking the first element 720 to the second element 730 may include covering second element 730 and first element 720 by a third, cover element 750 which may fit to the exact size and shape of second element 730 and first element 720 attached together. Top element 720 may include a locking nail 725 which may be attached or secured to an item (not shown) held between second element 730 and first element 720 when in locked position inside cover element 750.

Figure 7C:
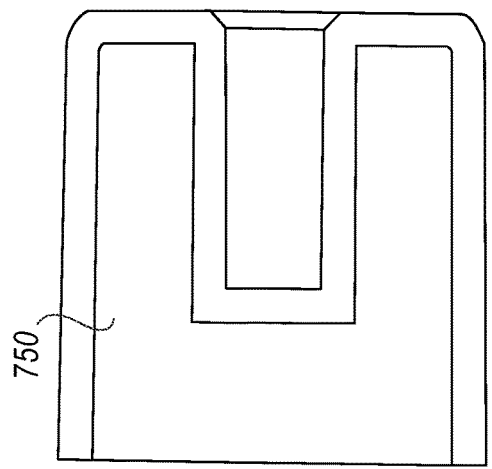
FIGS. 7A, 7B, 7C and 7D are schematic cross-section views of an exemplary securing device according to some embodiments of the invention.
Figure 7D:
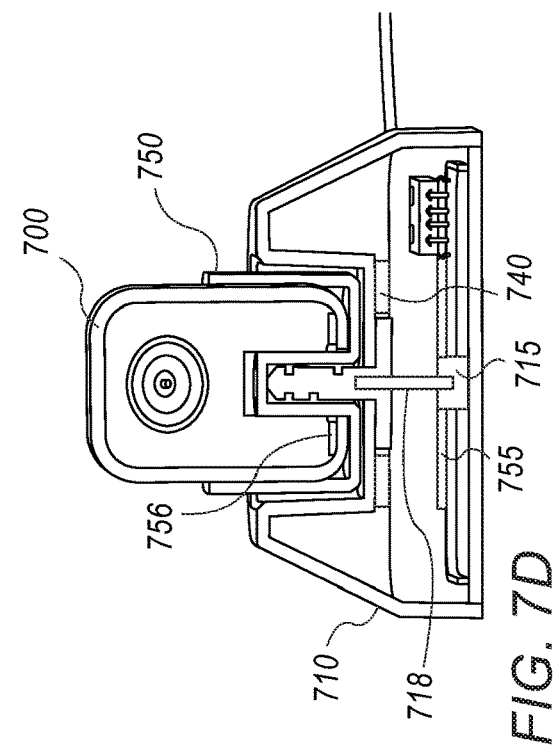
Figure 7A:
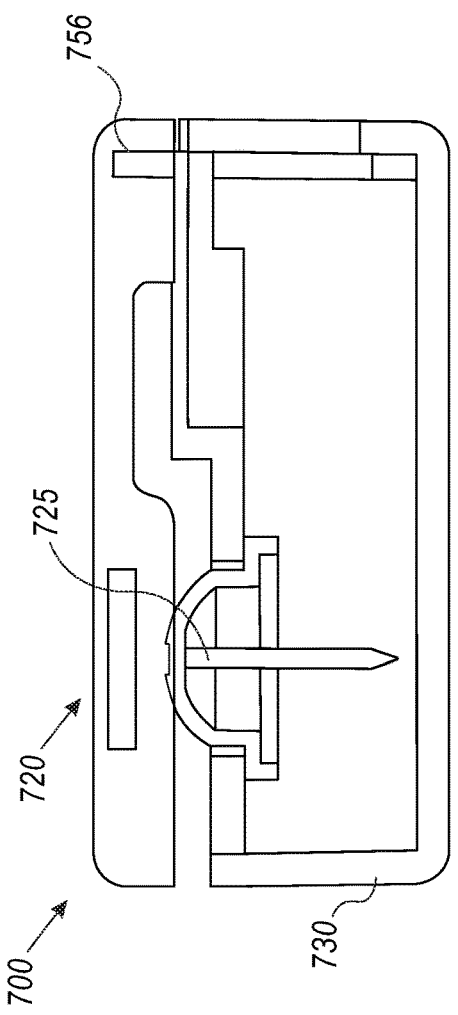
Figure 7B:
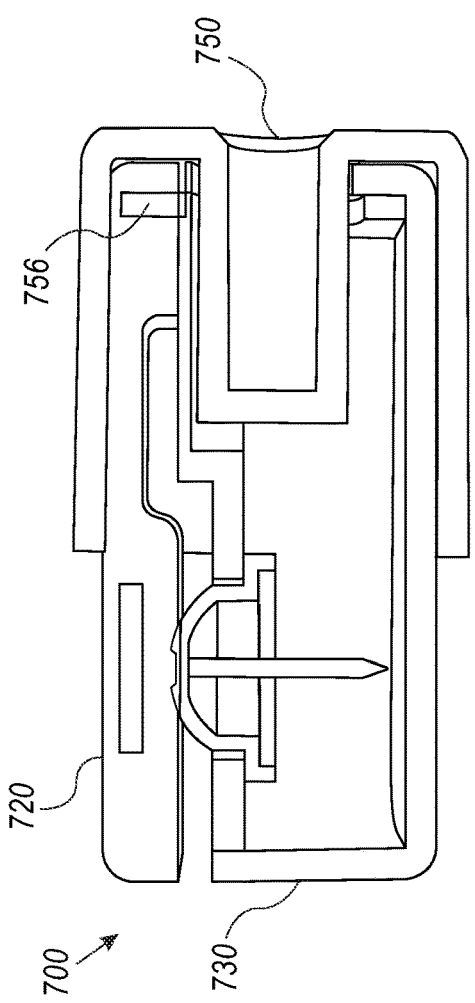

According to some embodiments of the invention, locking nail 725 may protrude from top element 720 and may be fastened or secured to an item when top element 720 and bottom element 730 are secured or held by cover element 750, as shown in FIG. 7C, also referred to herein as "locking state". Device 700 may further include a board or surface 756, e.g., a printed circuit board (PCB), which may mechanically support and electrically connect one or more electronic components. Board 756 may include, for example, ID unit 116 and/or transceiver 116 of FIG. 1 or any element of board 356 of FIG. 4A.

Device 700 may be inserted into cradle 710, when in the locking state. According to some embodiments of the invention, cradle 710 may include an ID reader unit 740 and a communication unit 755 which may be similar to ID reader unit 340 and a communication unit 355 of cradle 310, respectively, as described in other embodiments of the invention. Cradle 710 may include a motor 715 connected to an unlocking pin 718. Cradle 710 may further include a battery to provide or supply motor 715 with electrical power, e.g., DC voltage. In some embodiments the power to motor 715 may be supplied by electrical cable connected to cradle 710.

Communication unit 755 may communicate with external computing device associated with the payment transaction, e.g., payment system 120 and/or gateway server 132 of FIG. 1. Transceiver included in communication unit 755 may receive an indication signal indicating that device 700 having a specific identification code may be opened or released. Communication unit 755 may compare the identification code received from the computing device associated with the payment transaction and the identification code identified by ID reader unit 740, e.g., the included in ID unit of device 700. If the identification codes are identical, communication unit 755 may operate motor 715. Motor 715 may push unlocking pin 718 upon receipt of the indication signal to allow the unlocking top element 720 and bottom element 730 from cover element 750.

Removing cover element 750 may allow separation of top element 720 from bottom element 730 and releasing of locking nail 725 from base element 730 and from an item attached to device 700. Releasing cover element 750 by unlocking pin 718 may be performed upon receipt of a signal indicating a completion of a successful payment transaction and by insertion of device 700 covered by cover element 750 into a cradle 710.

Reference is made to FIGS. 8A and 8B, which are schematic partially transparent and exploded views of an exemplary securing device, according to some embodiments of the invention. A securing device 800 may be, for example, securing device 100 of FIG. 1, and its locking mechanism may be, for example, locking mechanism 117 of FIG. 1. Securing device 800 may comprise a first element or component 820 and a second element or component 830. Component 820 also referred to herein as "top element" or "cover element", while component 830 may be referred to herein as "bottom element" or "base element". When top element 820 is secured or attached to base element 830, an item, e.g., item 140 of FIG. 1 may be placed between top element 820 and base element 830 so as to be attached or secured to securing device 800.

According to some embodiments of the invention, locking nail 825 may protrude from top element 820 and may be fastened or secured to an item when top element 820 is inserted into bottom element 830, as shown in FIG. 8B, also referred to herein as "locking state". Locking nail 825 may be fastened by a locking cone 809 and a locking element 808 of top element 820 and by rotating pin 807 of bottom element 830. Securing device 800 may include a motor 833 connected to a moving pin 801. Moving pin 801 may include a ring having a protrusion 802 that may fit into an opening in rotating pin 807. Motor 833 may move moving pin 801 backward and forward, thereby enabling a rotation or movement of rotating pin 807 by protrusion of ring 802. A rotational move of rotating pin 807 may push locking element 808 and locking cone 809 and may allow release of locking nail 825 from bottom element 830.

Securing device 800 may further include a battery to provide or supply motor 833 with electrical power, e.g., DC voltage. Device 800 may further include a board or surface 856, e.g., a printed circuit board (PCB), which may mechanically support and electrically connect one or more electronic components. Board 856 may include, for example, ID unit 116 and/or transceiver 116 of FIG. 1, ID reader unit, and a communication unit e.g., ID reader unit 340 and a communication unit 355 of board 356 of FIG. 4A.

A receiver located on board 856 may receive an indication signal indicating that a device 800 having a specific identification code may be opened or released upon a completion of a payment transaction related to device 800. Receiving of the indication signal may operate motor 833. Motor 833 may move moving pin 801 backward, which may rotate rotating pin 807 by protrusion of ring 802 located on moving pin 801. A movement or rotation of rotating pin 807 may allow unlocking movement of the locking mechanism and releasing of locking nail 825 from device 800. Unlocking device 800 may include releasing locking nail 825 from base element 830 and releasing an item attached to device 800.

In some embodiments of the invention, identifying a product based on the unique identification code of a securing device attached to the product may allow inventory management by automatic tracking and updating an inventory database. Furthermore, identifying a product based on the unique identification code of a securing device attached to the product may allow automatic tracking and updating a location of said product, e.g., in a shop, in a storage, warehouse and the like. Some embodiments of the invention may allow automatically alert upon a detection of an unsafe unlocking of a locking mechanism of a securing device.

Figure 9:
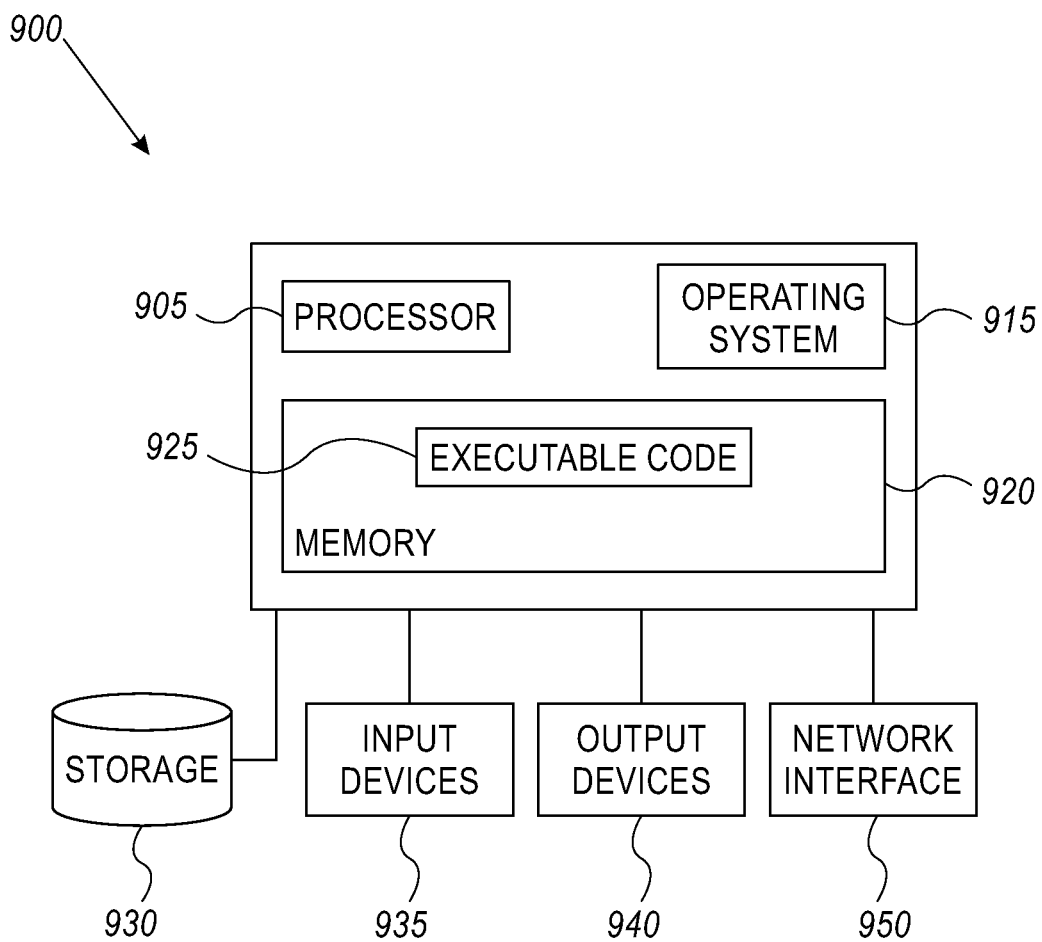
FIG. 9 illustrates an exemplary computing device according to an embodiment of the invention.

FIG. 9 illustrates an exemplary computing device according to an embodiment of the invention. For example, a computing device 900 with a processor 905 may be used to perform a payment transaction and to send a signal upon a completion of a payment transaction, according to embodiments of the invention. For example, computing device 900 may be for example, payment system 120 and/or any of remote services 130, e.g., gateway server 132, processor 131 and/or database 133.

Computing device 900 may include a processor 915 that may be, for example, a central processing unit processor (CPU), a chip or any suitable computing or computational device, an operating system 915, a memory 920, a storage 930, input devices 935 and output devices 940. Processor 905 may be or include one or more processors, etc., co-located or distributed. Computing device 1100 may be for example a smart device, a smartphone, workstation or a personal computer, a laptop, or may be at least partially implemented by one or more remote servers (e.g., in the "cloud").

Operating system 915 may be or may include any code segment designed and/or configured to perform tasks involving coordination, scheduling, arbitration, supervising, controlling or otherwise managing operation of computing device 900, for example. Operating system 915 may be a commercial operating system. Memory 920 may be or may include, for example, a Random Access Memory (RAM), a read only memory (ROM), a Dynamic RAM (DRAM), a Synchronous DRAM (SD-RAM), a double data rate (DDR) memory chip, a Flash memory, a volatile memory, a non-volatile memory, a cache memory, a buffer, a short term memory unit, a long term memory unit, or other suitable memory units or storage units. Memory 920 may be or may include a plurality of possibly different memory units.

Executable code 925 may be any executable code, e.g., an application, a program, a process, task or script. Executable code 925 may be executed by processor 905 possibly under control of operating system 915. For example, executable code 925 may be or include code for encoding one or more digital images, according to embodiments of the invention.

Storage 930 may be or may include, for example, a hard disk drive, a floppy disk drive, a Compact Disk (CD) drive, a CD-Recordable (CD-R) drive, a universal serial bus (USB) device or other suitable removable and/or fixed storage unit. In some embodiments, some of the components shown in FIG. 9 may be omitted. For example, memory 920 may be a non-volatile memory having the storage capacity of storage 930. Accordingly, although shown as a separate component, storage 30 may be embedded or included in memory 920. Storage 930 and or memory 920 may be configured to store any information related to a plurality of items, products and to a plurality of securing devices or any other information required for performing embodiments of the invention.

Input devices 935 may be or may include a camera, a mouse, a keyboard, a touch screen or pad or any suitable input device. It will be recognized that any suitable number of input devices may be operatively connected to computing device 900 as shown by block 935. Output devices 940 may include one or more displays, speakers and/or any other suitable output devices. It will be recognized that any suitable number of output devices may be operatively connected to computing device 900 as shown by block 940. Any applicable input/output (I/O) devices may be connected to computing device 900 as shown by blocks 935 and 940. For example, a wired or wireless network interface card (NIC), a modem, printer or facsimile machine, a universal serial bus (USB) device or external hard drive may be included in input devices 935 and/or output devices 940. Network interface 950 may enable device 900 to communicate with one or more other computers or networks. For example, network interface 950 may include a Wi-Fi or Bluetooth device or connection, a connection to an intranet or the internet, an antenna etc.

Embodiments described in this disclosure may include the use of a special purpose or general-purpose computer including various computer hardware or software modules, as discussed in greater detail below.

Some embodiments within the scope of this disclosure also include computer-readable media, or non-transitory computer storage medium, for carrying or having computer-executable instructions or data structures stored thereon. The instructions when executed may cause the processor to carry out embodiments of the invention. Such computer-readable media, or computer storage medium, can be any available media that can be accessed by a general purpose or special purpose computer. By way of example, and not limitation, such computer-readable media can comprise RAM, ROM, EEPROM, CD-ROM or other optical disk storage, magnetic disk storage or other magnetic storage devices, or any other medium which can be used to carry or store desired program code means in the form of computer-executable instructions or data structures and which can be accessed by a general purpose or special purpose computer. When information is transferred or provided over a network or another communications connection (either hardwired, wireless, or a combination of hardwired or wireless) to a computer, the computer properly views the connection as a computer-readable medium. Thus, any such connection is properly termed a computer-readable medium. Combinations of the above should also be included within the scope of computer-readable media.

Computer-executable instructions comprise, for example, instructions and data which cause a general-purpose computer, special purpose computer, or special purpose processing device to perform a certain function or group of functions. Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

As used herein, the term "module" or "component" can refer to software objects or routines that execute on the computing system. The different components, modules, engines, and services described herein may be implemented as objects or processes that execute on the computing system (e.g., as separate threads). While the system and methods described herein are preferably implemented in software, implementations in hardware or a combination of software and hardware are also possible and contemplated. In this description, a "computer" may be any computing system as previously defined herein, or any module or combination of modulates running on a computing system.

For the processes and/or methods disclosed, the functions performed in the processes and methods may be implemented in differing order as may be indicated by context. Furthermore, the outlined steps and operations are only provided as examples, and some of the steps and operations may be optional, combined into fewer steps and operations, or expanded into additional steps and operations.

The present disclosure is not to be limited in terms of the particular embodiments described in this application, which are intended as illustrations of various aspects. Many modifications and variations can be made without departing from its scope. Functionally equivalent methods and apparatuses within the scope of the disclosure, in addition to those enumerated, will be apparent to those skilled in the art from the foregoing descriptions. Such modifications and variations are intended to fall within the scope of the appended claims. The present disclosure is to be limited only by the terms of the appended claims, along with the full scope of equivalents to which such claims are entitled. It is also to be understood that the terminology used in this disclosure is for the purpose of describing particular embodiments only and is not intended to be limiting.

This disclosure may sometimes illustrate different components contained within, or connected with, different other components. Such depicted architectures are merely exemplary, and many other architectures can be implemented which achieve the same or similar functionality.

Aspects of the present disclosure may be embodied in other forms without departing from its spirit or essential characteristics. The described aspects are to be considered in all respects illustrative and not restrictive. The claimed subject matter is indicated by the appended claims rather than by the foregoing description. All changes which come within the meaning and range of equivalency of the claims are to be embraced within their scope.

The invention claimed is:

1. A device for a secured purchase process, the device comprising:
   a first element comprising a locking mechanism;
   a second element comprising a protruding nail to attach said first element to said second element and to an item, by insertion of the protruding nail into the locking mechanism;
   a receiver to receive a signal upon a completion of a payment transaction, wherein an unlocking movement of the locking mechanism is enabled by the signal, and wherein the unlocking movement is configured to allow release of the protruding nail from the first element and releasing of the item from the device; and
   a cradle to allow said releasing of the item from said device when said device is located within said cradle, wherein the cradle comprises one or more push pins configured to push one or more plunger receivers upon receiving the signal.

2. The device of claim 1, wherein the device comprising:
   a motor; and
   a rotating pin,
   wherein the motor is configured to rotate the rotating pin upon receipt of the signal to allow the unlocking movement of the locking mechanism.

3. The device of claim 1, wherein the locking mechanism comprising:
   one or more release levers;
   the one or more plunger receivers;
   a locking cone; and
   one or more metal balls to fasten said locking nail to said locking cone while being held by said one or more release levers when in locked position.

4. The device of claim 3, wherein the unlocking movement comprises applying force on said one or more release levers by said one or more plunger receivers and causing said one or more release levers to rotate, thereby enabling said locking cone to release said locking nail.

5. The device of claim 1, wherein said device comprises a motor to operate the one or more push pins upon a receipt of said signal.

6. The device of claim 5, wherein the motor is configured to operate the one or more push pins based on a unique sequence related to a unique identification code of the device.

7. A method for a controlling releasing of a securing device, the method comprising:
- encoding a device with a unique identification;
- attaching said securing device to said item by a locking mechanism included in the device, wherein the locking mechanism is latched to said securing device by one or more release levers;
- upon a completion of a payment transaction, receiving a signal, wherein the signal comprises a command related to the unique identification;
- applying force in a predetermined order on one or more plunger receivers included in the device to release said one or more release levers, wherein the predetermined order is based on the command;
- unlatching said locking mechanism from said device to allow releasing of said device from said item;
- placing said device in a cradle;
- receiving the signal by the cradle; and
- applying said force in said predetermined order by one or more pins included in said cradle.

* * * * *